United States Patent
Pius et al.

(10) Patent No.: US 11,553,358 B2
(45) Date of Patent: Jan. 10, 2023

(54) MOBILE DEVICE CONFIGURATION FOR WIRELESS NETWORKS

(71) Applicant: Google LLC, Mountain View, CA (US)

(72) Inventors: Roshan Pius, San Jose, CA (US); Ning Zhang, Saratoga, CA (US); Etan Gur Cohen, San Francisco, CA (US)

(73) Assignee: Google LLC, Mountain View, CA (US)

( * ) Notice: Subject to any disclaimer, the term of this patent is extended or adjusted under 35 U.S.C. 154(b) by 51 days.

(21) Appl. No.: 17/059,028

(22) PCT Filed: May 30, 2019

(86) PCT No.: PCT/US2019/034597
§ 371 (c)(1),
(2) Date: Nov. 25, 2020

(87) PCT Pub. No.: WO2019/232174
PCT Pub. Date: Dec. 5, 2019

(65) Prior Publication Data
US 2021/0211900 A1   Jul. 8, 2021

Related U.S. Application Data

(60) Provisional application No. 62/678,628, filed on May 31, 2018.

(51) Int. Cl.
*H04W 24/02* (2009.01)
*H04W 24/08* (2009.01)
*H04W 84/12* (2009.01)

(52) U.S. Cl.
CPC .......... *H04W 24/02* (2013.01); *H04W 24/08* (2013.01); *H04W 84/12* (2013.01)

(58) Field of Classification Search
CPC ...... H04W 24/02; H04W 24/08; H04W 84/12
See application file for complete search history.

(56) References Cited

U.S. PATENT DOCUMENTS 9,602,345 B2    3/2017  Saha et al.
10,051,499 B1 *  8/2018  Dron ................... H04W 36/30
(Continued)

FOREIGN PATENT DOCUMENTS

EP           3226603        10/2017
WO     WO 2016155945        2/2016

OTHER PUBLICATIONS

PCT International Search Report and Written Opinion in International Appln. No. PCT/US2019/034597, dated Jul. 26, 2019, 16 pages.

(Continued)

*Primary Examiner* — Jae Y Lee
(74) *Attorney, Agent, or Firm* — Fish & Richardson P.C.

(57) ABSTRACT

Methods, systems, and apparatus, including computer-readable media, for enabling a client device to learn characteristics of one or more access points in a wireless network used by the client device. In addition to learning the characteristics of the access point, the client device also can learn its own hardware characteristics, its usage profile, its environmental operation condition, its user preferences, and its computing context. The client devices uses the learned characteristics to realize computing efficiencies based on dynamic configuration of wireless network settings at the client device.

17 Claims, 9 Drawing Sheets

(56) References Cited

U.S. PATENT DOCUMENTS

| | | |
|---|---|---|
| 2004/0047324 A1 | 3/2004 | Diener |
| 2013/0143494 A1 | 6/2013 | Chen et al. |
| 2017/0264501 A1 | 9/2017 | Mathen et al. |
| 2018/0249341 A1* | 8/2018 | Park ................... H04W 24/10 |
| 2019/0014003 A1* | 1/2019 | HomChaudhuri .. H04L 41/0816 |
| 2020/0204484 A1* | 6/2020 | Altman ................ H04L 47/125 |
| 2020/0236043 A1* | 7/2020 | Sze ..................... H04L 43/106 |
| 2020/0280863 A1* | 9/2020 | Cioffi .................. H04W 24/10 |

OTHER PUBLICATIONS

PCT International Preliminary Report on Patentability in International Appln. No. PCT/US2019/034597, dated Dec. 10, 2020, 11 pages.

* cited by examiner

MOBILE DEVICE CONFIGURATION FOR WIRELESS NETWORKS

CROSS-REFERENCE TO RELATED APPLICATION

This application is a National Stage Application under 35 U.S.C. § 371 and claims the benefit of International Application No. PCT/US2019/034597, filed May 30, 2019, which claims priority to U.S. Application No. 62/678,628, filed May 31, 2018, entitled MOBILE DEVICE CONFIGURATION FOR WIRELESS NETWORKS, the disclosure of which is incorporated herein by reference.

FIELD

The present specification generally describes techniques for improving wireless communications between client devices and access points in a wireless network.

BACKGROUND

Wireless communications system can include one or more access points (APs) and multiple communications devices, such as smartphones, laptop computers, tablets devices, or other related wireless computing devices. A wireless access point can serve, or provide data communication services to, a set of devices within a coverage area of the access point. In routine operations of the communications system, the access point uses protocols specified by wireless standards to manage how resources are provisioned to a device in the wireless network. The protocols may specify various operating parameters for the access point and the device.

SUMMARY

This specification describes systems, methods, devices, and other techniques by which a client wireless communication device determines characteristics of one or more access points in one or more wireless networks used by the client device. In addition to, learning the characteristics of the access point, the client device can also learn its own hardware characteristics, its usage profile, its environmental operation condition, its user preferences, and its computing context. The computing context can include communication routines used by the client device as well as activity sessions that involve transmitting and receiving data signals at a given wireless location. The client devices use the learned characteristics to realize computing efficiencies based on dynamic configuration of wireless network settings at the client device.

The characteristics of the access point and the device hardware can be learned by measuring the client device's antenna imbalance, and statistics of the device transmission rate, inferring the access point's transmission rate selection algorithm by measuring statistics of the device receive rate, and checking if 2-stream high modulation coding and scheme (MCS) rate is being used or not. The usage profile can be learned by collecting parameters including: i) transmit time per transmit rate, per network; ii) receive time per receive rate, per network; iii) listen time, per network; iv) scan time, per network; and/or v) clear channel assessment (CCA) busy time, per network.

The client device can learn user application needs and a user's usage patterns. For example, the user's application needs and usage patterns cart be learned by monitoring packets transmitted within the network, internet protocols (e.g., IPv4 or IPv6), regular ping packets, re-transmission patterns, access categories used, transmit control protocol (TCP) ramp up patterns, and/or a user's computing context. In some implementations, the client device can learn which applications are important to the user through analysis of foreground and background applications, real-time user surveys, user intervention, or real-time user preference selection.

The client device can learn one or more WI-FI operation conditions. For example the WI-FI operation conditions are learned by monitoring a delta or difference between wireless transmission rates and wireless receive rates. In some implementations, if the delta exceeds a threshold difference value, then the client device dynamically configures or selects different transmit and receive wireless configurations. In one cases, the client device detects a particular imbalance of the links and configures WI-FI transmit and receive settings in response to the detection. For example, the WI-FI settings can be configured as one transmit chain and two receive chains or two transmit chains and one receive chain, based on attributes of the receiver links.

The client device learns of e or more user inputs. For example, a user's inputs are learned to determine whether the user has specific WI-FI configuration requests on the client device or on the wireless network. Specific WI-FI configuration requests can include a particular frequency hand preference for the client device or priority of certain applications.

One aspect of the subject matter described in this specification can be embodied in a computer-implemented method. The method includes obtaining, at a client device, first metrics that describe characteristics of a wireless network with which the client device is configured to associate; and obtaining, at the client device, second metrics that describe hardware features of the client device, the hardware features being used to enable a wifeless capability of the client device. The method includes determining, at the client device, one or more received signal strength indications that indicate at least one imbalance measure that limits wireless performance of the client device; and generating, at the client device, a data model that stores information describing predicted characteristics of the client device for the wireless network, the data model being generated based on analysis of the first metrics, the second, metrics, and the one or more received signal strength indications. The method also includes determining a configuration setting for the client device based on the predicted characteristics of the client device for the wireless network; and using the configuration setting for the client device to adjust a parameter of at least one of (i) an association process for associating the client device with the wireless network or (ii) an ongoing connection between the client device and the wireless network.

In some implementations, generating the data model includes computing first inferences based on the first metrics, where the first inferences correspond to at least one of: an inferred rate selection algorithm of an access point of the wireless network or an inferred receive rate of the access point of the wireless network. In some implementations, generating the data model includes computing second inferences based on the second metrics, where the second inferences correspond to at least one of: a modulation and coding scheme of the client device or a transmission rate of the client device.

In some implementations, determining the configuration setting for the client device includes: computing, based on the predicted characteristics of the data model, multiple received signal strength indications that indicate a relative received signal strength in the wireless network; determining a measure of received signal strength imbalance between two respective channels of the client device based on the relative received signal strength in the wireless network; and determining the configuration setting for the client device based on the measure of received signal strength imbalance between the two respective channels of the client device.

In some implementations, determining the configuration setting for the client device includes: determining, based on the predicted characteristics of the data model, a resource requirement of the wireless network for using an application accessed at the client device; generating, based on the resource requirement of the wireless network, a usage profile that indicates usage patterns of the client device in response to using the application; and determining the configuration setting for the client device based on the usage profile of the client device.

In some implementations, determining the resource requirement includes: determining at least one of: a latency requirement, a data throughput requirement, or a power requirement associated with using the application at the client device. In some implementations, generating the usage profile includes obtaining an aggregate set of parameters that describe usage of resources associated with one or mare access points of the wireless network when the application is accessed and used at the client device.

In some implementations, determining the one or more received signal strength indications includes: determining at least one received signal strength indication for a communication channel of the client device in response to detecting a change in a transmission rate or a modulation scheme of an access point included in the wireless network.

In some implementations, determining, based on the predicted characteristics of the data model, a first measure of stability of a data connection between the access point of the wireless network and the client device, the first ea sure of stability indicating a duration of the data connection; and adjusting, based on the configuration setting for the client device, a parameter of a first association process between the client device and the access point to increase the first measure of stability of the data connection.

In some implementations, determining, based on the predicted characteristics of the data model, a second measure of stability of an ongoing data connection between the access point of the wireless network and the client second measure of stability indicating an inferred duration of the ongoing data connection; and adjusting, based on the configuration setting for the client device, a parameter of a second association process between the client device and the access point to increase the second measure of stability of the data connection.

In some implementations, a computing system accessible at a client device is operable to measure antenna imbalance of communication channels that are used by a client device to communicate with an access point. The system is operable to infer one or more rate selection algorithms being employed by the access point to communicate with the client device. The system can measure transmit rate of the client device or access point based on information obtained at the client device. The system is operable to adjust client device stream capability based on one or more of the antenna imbalance, the rate selection algorithm(s), or a particular transmit rate.

In some implementations, the system is operable to collect: and aggregate one or more parameters indicating packet receive times and transmit times for data communications between devices and access points in a wireless network. The system can estimate a total WI-FI power consumption associated with a 2×2 stream mode of an access point that communicates with the device. The system also estimates a total WI-FI power consumption associated with a 1×1 stream mode of an access point. The system can provide the aggregated parameters and estimated power consumption to an example machine-learning engine to learn or predict a WI-FI usage profile of devices in a wireless network. The system determines one or more configuration settings for the devices based on a predicted usage profile.

In some implementations, the system is operable to determine connectivity requirements based on application usage at the client device. The system determines a latency requirement of an application with reference to the connectivity requirements for a given application usage. The system can also determine WI-FI connectivity activity that is associated with usage of the application. The system determines an importance of an application for a specific user based on the data that describes the connectivity and latency associated with usage of the application.

In some implementations, the system is operable to determine whether a device is located in a dense enterprise, environment, such as a wireless network with multiple users. Based on this determination, the system determines whether multi/single-user features should be enabled or not. For example, if the device is located in a dense enterprise environment, the system can determine that multi-user features should be enabled, whereas if the device is not located in a dense enterprise environment, the system can determine that single-user features should be enabled. The system can also determine whether to enable or disable a particular WI-FI protocol based on the density (e.g., 20 or more users) of the enterprise environment and the features enabled at the client device. The system adjusts configuration settings of the client device in response to information about network changes in a particular enterprise environment.

In some implementations, the system is operable to monitor a delta between transmission rate and receive rate observed between devices in a wireless network. The system determines an imbalance between respective link budgets using information describing the delta between the transmission rate and receive rate. For example, a first link budget can be for a transmitter link, whereas a second link budget can be for a receiver link. The system determines respective WI-FI transmit and receive configurations based on the determined imbalance between the respective link budgets. The system can monitor RSSI to determine transmitter link and receiver link quality for selecting a particular network or configuring functions associated with a selected network.

Other implementations of this and other aspects include, corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus, to perform the actions.

The subject matter described in this specification can be implemented in particular embodiments and can result in one or more of the following advantages. The described techniques can enable client devices of wireless communication systems to realize efficiencies based on dynamic configuration of network settings at the client device. For example, the techniques can include using changes in transmission rates and modulation schemes of individual access points to trigger analysis of received signal strength by client devices. Data describing, signal strength indications can be used by a client device to determine wireless settings that improve or optimize performance of the client device. For example, the client device can realize improvements in performance as measured by one or more criteria (e.g., power consumption, latency, processing bandwidth, etc.) relative to the performance that would have been realized if the dynamically optimized wireless settings had not been applied.

Optimized wireless network settings of a client device can result in reduced power consumption and processor utilization by the device and by access points in a wireless network. In particular, improved signal quality can result in more stable data connections between access points and user devices in a wireless network. Such stable connections can lead to reductions in processor utilization and signal processing operations or more useful reallocation of processing resources that might have been required to re-establish failed or severed data connections that occur when the described techniques are not employed. Hence, the improved wireless settings of the client device can lead to more efficient processor and memory utilization, which can provide improvements to one or more computer systems described herein.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
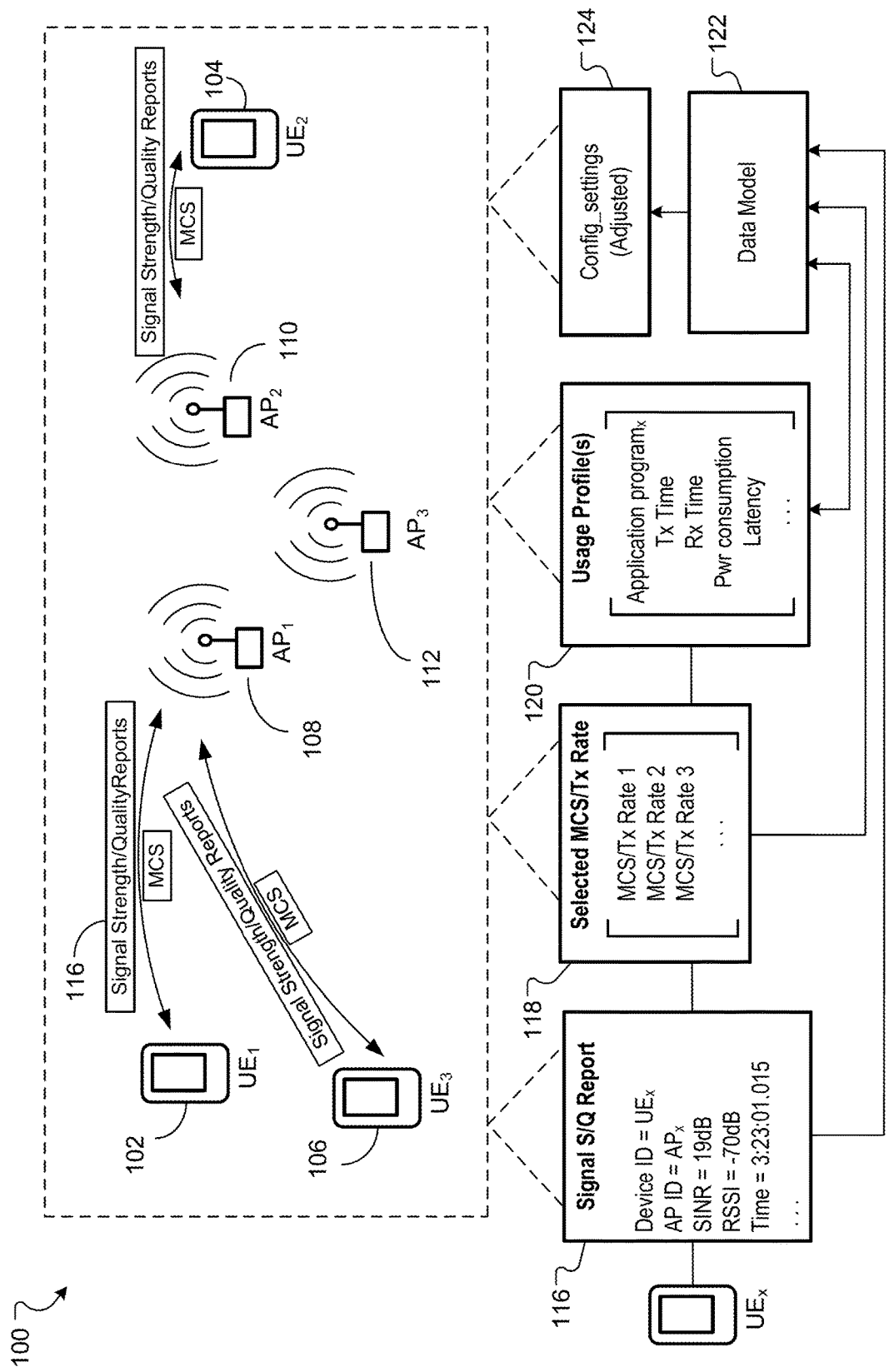
FIG. 1 is a diagram that illustrates an example communications system.

Performance of a mobile or client device (e.g., smartphones) in a wireless network can be defined by one or more aspects, such as throughput, power consumption, latency, range, and reliability. Each aspect can be characterized by a performance metric. The performance metric may change with adjustments to operation conditions of an access point in the network, user computing contexts, and a radio environment of the network. In some cases, there are trade-offs among performance metrics. With advancements of WI-FIWI-FI technology, there are several features that can improve WI-FI performance metrics under certain operation conditions. Client devices that use a single wireless configuration setting for all operating modes can degrade overall device performance. A more optimal wireless configuration setting can be determined based on operation conditions and user data obtained or learned at the client device.

Some wireless standards (e.g., IEEE 802.11 WI-FI standard) include protocols to enable a client device to adjust its wireless settings dynamically. For example, the 802.11n protocol includes a spatial multiplexing power save (SMPS) feature to allow an STA (e.g., an access point) to operate with only one active receive chain for the purpose of power saving. The 802.11ac protocol supplements the SMPS feature by including an operating mode notification (OMN) frame to notify a first STA, such as an access point, that a transmitting second STA, such as a client device, is changing its operating channel width, changing the maximum number of spatial streams it can receive, or both. The 802.11 ax protocol further supplements these features by including receive operating mode indications (ROMI) and transmit operating mode indications (TOMI).

The ROMI is a procedure to dynamically adapt a number of active receive chains and channel width for reception of subsequent protocol data units (e.g., PPDUs) that are associated with a physical layer convergence procedure (PLCP). The ROMI procedure uses a field in a media access control (MAC) header of a data frame, to perform the dynamic adaptions. The TOMI is a procedure for client devices to dynamically adapt their transmit capability. For example, client devices can adapt their transmit capability by adjusting a channel width, adjusting a maximum number of spatial streams or changing between single user (SU) or uplink (UL) multi-user (MU) operation. In some implementations, a client device associates to an access point with its full capability. The client device can then use one or more of the above protocols to change some of its wireless configurations.

In this context, this specification describes techniques that allow a client device to learn characteristics of one or more access points in a wireless network used by the client device. In addition to learning the characteristics of the access point, the client device also can learn its own hardware characteristics, its usage profile, its environmental operation condition, its user preferences, and/or its computing context. The computing context can include communication routines used by the client device as well as activity sessions that involve transmitting and receiving data signals at a given wireless location. The client device stores in memory information describing the learned characteristics of its hardware features and of the access points. The client device uses the information to dynamically adjust wireless configuration settings upon association with an access point or to dynamically adjust wireless configuration settings after association with the access point.

FIG. 1 illustrates an example communications system 100. System 100 includes multiple client/user devices 102, 104, and 106, and individual access points 108, 110, and 112. System 100 can represent a wireless communication network. In the network of system 100, a user device can automatically adjust its operating parameters and wireless settings based on observed performance, signal conditions, selected modulation schemes/transmissions rate of a communications network, and a usage profile of the client device.

For example, as described in more detail below, system 100 is operable to generate a signal strength/quality report 116 that includes data describing received signal strength and observed signal quality at a user/client device that is associated with an access point in a wireless network. The observed signal quality can be indicated by a computed signal-to-interference-plus-noise ratio (SINR). The system 100 is also operable to determine or infer a selected modulation and coding scheme (MCS) and transmission (Tx) rate 118 employed by an access point. The system 100 obtains data associated with a usage profile 120 of the client device. For example, the system 100 obtained data can include parameter values for: i) transmit time per transmit rate, per network; ii) receive time per receive rate, per network; iii) power consumed at the client device; iv) application programs running at the client device; and/or v) latency experienced at the client device.

The client device generates a data model 122 that stores information describing predicted characteristics of the client device and the wireless network. For example, the data model 122 can be generated based on machine-learning analysis of received signal strength indications included in the report 116, the selected MCS and Tx rate 118 of the access points, and the parameter values associated with the usage profile 120. The system 100 can then determine configuration settings 124 for the client device based on information about machine-learned inferences or predicted characteristics of devices in a wireless network. For example, system 100 determines the configuration setting for the client device based on predicted characteristics of the client device, the access point or both.

In some implementations, the configuration settings can be adjusted settings that cause the client device to adjust parameters for how the client device communicates or interacts with one or more access points or other devices in the network. For example, in wireless (e.g., cellular) communication networks, a client device executes specific instructions that can improve device performance, observed data rates, and data throughput at the device compared to other user devices that do not use the described techniques.

Figure 2:
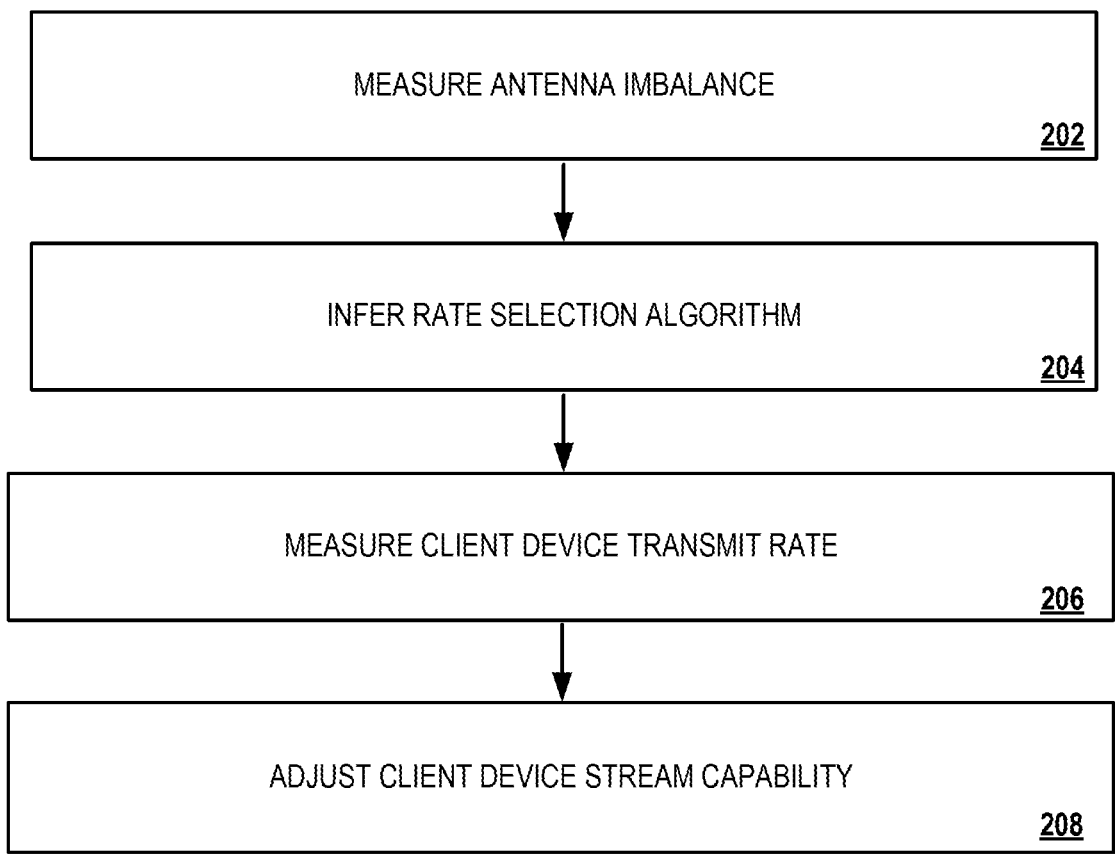
FIG. 2 is a flow chart of an example process for configuring a mobile device in a wireless network.

FIG. 2 is a flow chart of an example process 200 for configuring a mobile device in a wireless network.

Computing devices typically have 2×2 WI-FI which means WI-FI features of the device includes two radio chains that are connected to two antennas. The WI-FI features are capable of supporting 2-stream multiple input multiple output (MIMO). During device association with WI-FI access points, a client device exchanges its capability with the access point and informs the access point that the client device is capable of 2-stream MIMO reception. But, due to form factor reasons, the two antenna gains may be imbalanced. Table 1 below shows example antenna gains at 2.4 GHz and 5 GHz on various client devices. The antenna gain imbalance can be up to 7.5 dB at 2.4 GHz and 9 dB at 5 GHz. The 2.4 GHz and 5 GHz frequency values are each associated with a respective WI-FI radio signal of an access points. When one of the WI-FI radio signals is weaker (e.g., substantially weaker) than the other, the weaker radio chain may be of no performance benefit, yet still consuming the same amount of power as the stronger chain.

TABLE 1

| | Antenna Gains | |
| --- | --- | --- |
| | 2.4 GHz Antenna Gain (dBi) Chain 0/Chain 1 | 5 GHz Antenna Gain (dBi) Chain 0/Chain 1 |
| Client Device 1 | −5.5/−8.5 | −5.5/−9.5 |
| Client Device 2 | −6.5/−14 | −5.5/−10.5 |

TABLE 1-continued

| | Antenna Gains | |
| --- | --- | --- |
| | 2.4 GHz Antenna Gain (dBi) Chain 0/Chain 1 | 5 GHz Antenna Gain (dBi) Chain 0/Chain 1 |
| Client Device 3 | −6.5/−12 | −5.5/−9 |
| Client Device 4 | −16/−14.5 | −18/−9 |
| Client Device 5 | −9.5/−9.0 | −12/−8.5 |
| Client Device 6 | −9.0/−9.0 | −8.4/−10.5 |

Moreover, on the receive side, 2-stream MIMO may not function as desired in the presence of a large antenna imbalance. In some implementations, access points implement a linear rate selection algorithm, meaning that the access points cycle through rate selections in modulation and coding scheme (MCS) dimension. In some cases, an access point uses the 2-stream feature until experiencing failure with the lowest MCS for the 2-stream approach, before attempting rate selection using a 1-stream approach. The 802.11ac protocol includes several overlapping rates. For example, in an 80 MHz mode of the access point, the 1-stream and 2-stream rates are included in table 2 below.

TABLE 2

| 1-stream and 2-stream Rates | |
| --- | --- |
| 1-stream Rates | 2-stream Rates |
| 1-stream MCS0: 32.5 Mbps | 2-stream MCS0: 65 Mbps |
| 1-stream MCS1: 65 Mbps | 2-stream MCS1: 130 Mbps |
| 1-stream MCS2: 97.5 Mbps | 2-stream MCS2: 195 Mbps |
| 1-stream MCS3: 130 Mbps | 2-stream MCS3: 260 Mbps |
| 1-stream MCS4: 195 Mbps | 2-stream MCS4: 390 Mbps |
| 1-stream MCS5: 260 Mbps | 2-stream MCS5: 520 Mbps |
| 1-stream MCS6: 292.5 Mbps | 2-stream MCS6: 585 Mbps |
| 1-stream MCS7: 325 Mbps | 2-stream MCS7: 650 Mbps |
| 1-stream MCS8: 390 Mbps | 2-stream MCS8: 780 Mbps |
| 1-stream MCS9: 433.3 Mbps | 2-stream MCS9: 866.7 Mbps |

An example linear transmit rate selection algorithm reduces transmission rate when there is packet failure in a sequence of: 2-stream MCS9≥2-stream MCS8≥2-stream MCS7≥2-stream MCS6≥stream MCS5≥2-stream MCS4≥2-stream MCS3≥2-stream MCS2≥2-stream MCS1≥2-stream MCS0≥1-stream MCS0. Consequently, when there is a large antenna imbalance (e.g., ≥6.0 dB), the access point may select 2-stream approach with very low MCS. If the client device tells the access point it is only 1-stream capable, the access point will select 1-stream high MCS, which is a higher rate than 2-stream low MCS.

In this manner, and referring now to process 200, a client device can perform actions to obtain both device hardware characteristics and access point characteristics. For example, the client device determine antenna imbalance by measuring, computing, or otherwise obtaining an average received signal strength indication (RSSI) difference between two chains that correspond to respective communication channels of the device, at 2.4 GHz and 5 GHz respectively (202). RSSI corresponds to a relative received signal strength in a wireless environment. For example, RSSI provides an indication of a power level being received at a receive radio of a client device. In general, the higher the RSSI value, the stronger the received signal.

The client device infers the access point's rate selection algorithm by generating statistics of receive rates at the device and determining whether 1-stream high MCS rate is being used or not (204). In some implementations, the client device generates statistics of receive rates using a histogram of receive rates with the access point. The client device measures statistics of its transmit rate and determines whether 2-stream high MCS rate is being used or not (206). In some implementations, the client device measures statistics of transmit rates based on a histogram of transmit rates accessed by the client device.

Based on learned inferences (e.g., for predicting characteristics or settings of the wireless network and client device) obtained using the computing processes of blocks 202, 204, and 206, when an RSSI imbalance measure exceeds a threshold imbalance measure, a 1-stream high MCS rate is not being used from the receive rate histogram when the device associates with 2×2 2-stream capability, and a transmit rate histogram shows limited usage of stream top MCSs, then the client device adjusts its stream capability (208). For example, the client device dynamically configures one or more settings to employ 1×1 1-stream capability (208). In some implementations, this configuration adjustment improves throughput and reduces power consumption at the client device.

By learning the client device and access point characteristics, the system can also identify changes to these characteristics over time. In some implementations, if the characteristics change significantly over time, the client device uses a dynamic switching capability to automatically trigger adjustments to wireless configuration settings. In other implementations, a configuration choice can be saved along with a reference to one or more saved wireless networks. The configuration choice can be later used whenever the client device connects to or associates with an access point of a saved wireless network.

Figure 3A:
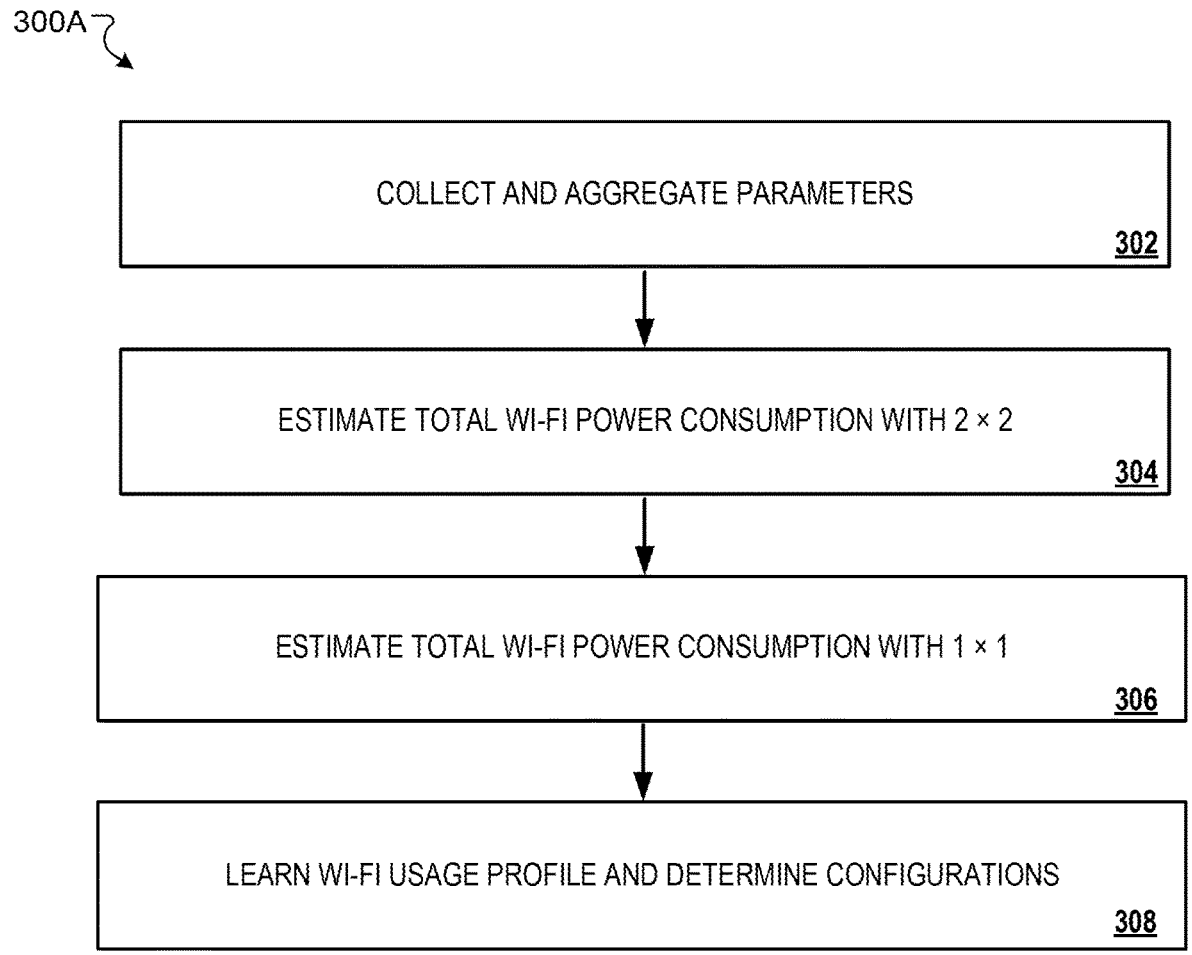
FIGS. 3A-3B are flow charts of example processes.

FIG. 3A is a flow chart of an example process 300 for configuring a client device in a wireless network. The client device can be configured based on a learned usage profile. For example, a client device can be used in a full capability mode, such as when the device uses 2×2 2-stream for an 80 MHz mode of an access point. While in a full, or other, device capability mode, a wireless network usage profile is learned by collecting and aggregating parameters (302) including: i) transmit time per transmit rate, per network; ii) receive time per receive rate, per network: iii) listen time, per network; iv) scan time, per network; and v) clear channel assessment (CCA) busy time, per network.

In some implementations, a client device accesses WI-FI power consumption lab measurements for transmit (Tx) power consumption per transmit rate, receive (Rx) power consumption per Rx rate, and listen power consumption, and scan power consumption. The client device can estimate total WI-FI power consumption per network per day with 2×2 80 MHz configuration (304).

The client device can estimate being configured in a partial capability mode, such as when the device uses 1×1 1-stream for a 20 MHz mode. To ensure a certain desired throughput is achieved, the system 100 assumes that Tx and Rx rates are reduced by a factor of 8 (since a factor of 2 comes from 2-stream≥1-stream, and a factor of 4 comes from 80 MHz≥20 MHz), if (sum of (a) over all rates)*8+ (sum of (b) over all rates)*8 (e)<1, then desired throughput can still be achieved. The total WI-FI power consumption per network per day with 1×1 20 MHz configuration is estimated (306). For example, a client device performs the estimates using WI-FI power consumption lab measurements for Tx power consumption per Tx rate, Rx power consumption per Rx rate, listen power consumption, and scan power consumption under 1×20 MHz configuration, which are lower than 2×2 80 MHz configuration.

A similar estimation can be done for other configurations or modes such as 2×2 2-stream 20 MHz, 2×2 2-stream 40 MHz, 1×1 1-stream 80 MHz, and 1×1 1-stream 40 MHz. Based on the above estimates, a client device can learn and/or analyze a user's WI-FI network usage profile and determine configurations that meet or exceed a desired data throughput with a minimal or threshold power consumption (308). By learning the usage profile, the client device can also identify when usage attributes change significantly over time for different locations, wireless networks, and access points. If usage changes significantly, then the configuration can be dynamically adjusted in accordance with the change in usage. In some implementations, rather than change dynamically, a configuration can, be personalized for a user. In some cases, when a client device senses WI-FI throughput is bottlenecked, the client device can dynamically change configurations to a full capability mode to improve throughput performance.

Figure 3B:
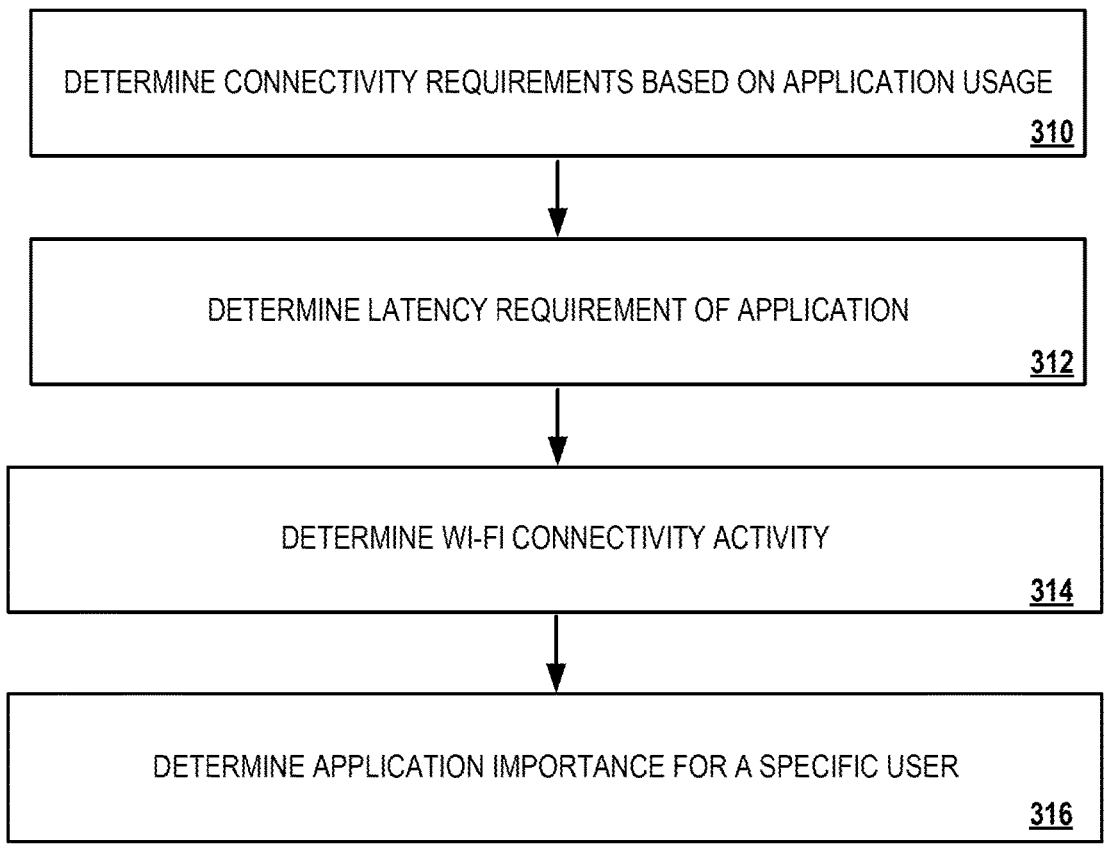

FIG. 3B is a flow chart of an example process for configuring a client device in a wireless network based on learning user application needs, such as data processing or wireless resource requirements, and user usage patterns.

When an application requests WI-FI resources, the client device can learn or determine what the application needs in terms of connectivity for a user's particular usage, specifically, throughput need, latency need, battery states, duration, time sensitivity, e.g., background job with no urgency to complete (310). If the client device has learned the user's typical usage and can predict the WI-FI connectivity quality, then the client device can configure its WI-FI settings for the best throughput/latency/power trade off. For example, a data hack-up application (app) may require a large amount of wireless data transmission that is not time sensitive (back-up within a day). Based on these usage attributes, the system can predict the best WI-FI network time slot of the day to most efficiently accomplish the back-up task is during the morning in the office. The client device can then schedule that data back-up app at the particular time slot with a full capability configuration.

In another example, if battery states are low while the client device is running applications that are not latency critical, then the system can be more aggressive about entering a WI-FI power save state (312). In another example, the 802.11ax protocol includes a Target Wake Time (TWT) feature that allows a client device and an access point to negotiate on a specific set of times to access a medium. The client device can go to sleep and save energy outside of TWT. Hence, if the client device predicts overall WI-FI connectivity activity (e.g., total throughput and latency) based on the running applications and predicted applications, then the system can schedule TWT with an appropriate duration and frequency (314).

In another example, after learning the application latency needs, the client device can assign different access categories (e.g., different priority) per applications through 802.11QoS protocols. The protocol defines eight (e.g., 1-8) user priorities which are grouped into four access categories (ACs), containing two user priorities each. For example, the four ACs can include Background, Best Effort (e.g., priority 0 & 3), Video (e.g., priority 4 & 5), Voice (e.g., priority 1 & 2). In some cases, user priority 0 can be placed into the Best Effort AC instead of the Background AC for backwards compatibility with non-QoS stations. The system can also cause the client device to change network selection based on application needs.

Figure 3C:
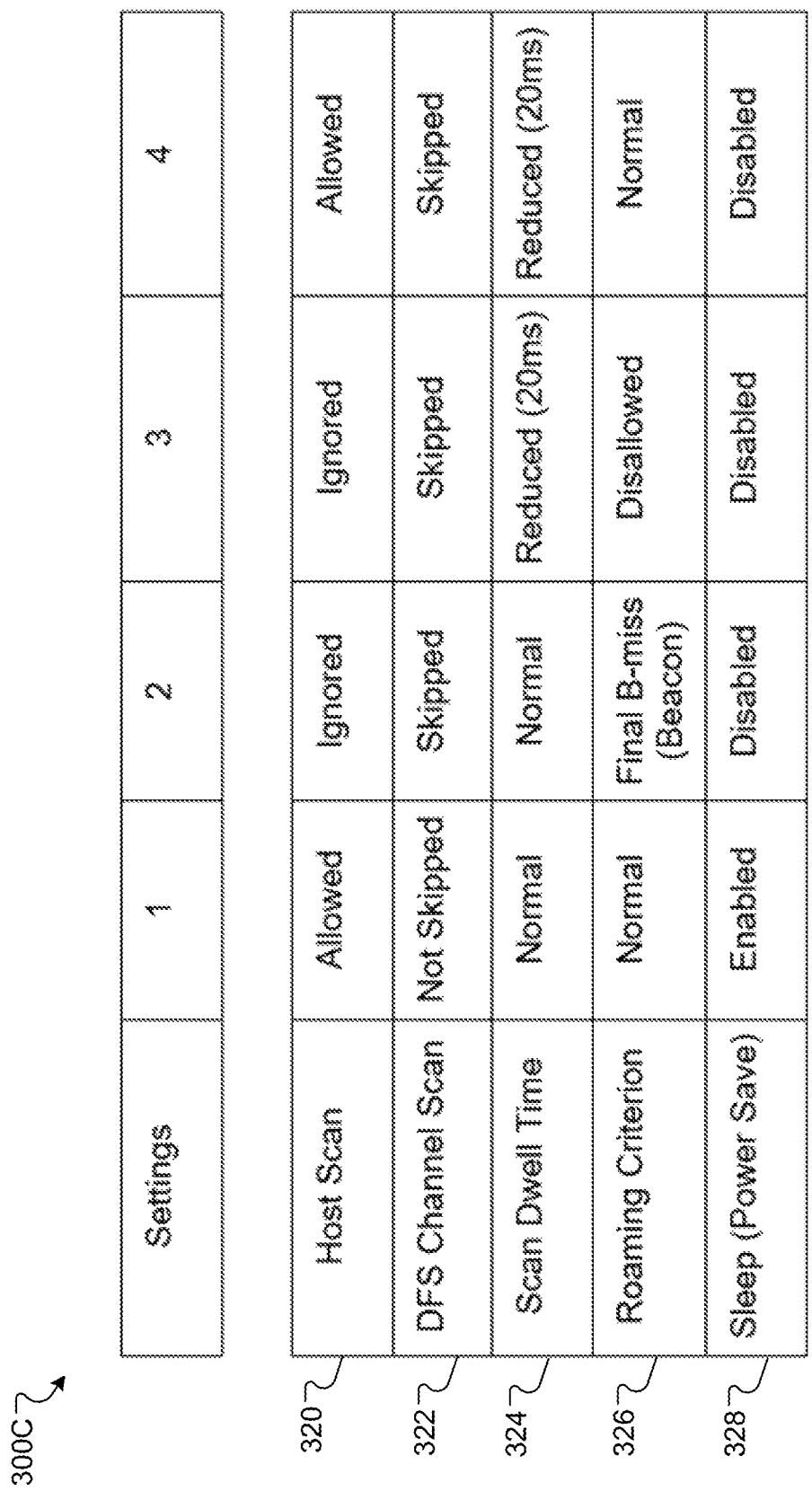
FIG. 3C shows settings, for configuring a mobile device in a wireless network.

For example, if latency, such as having low or reduced latency relative to some latency threshold, is important for an application, the system may choose not to associate with a mesh point if the overall latency is large, even if the mesh point has better RSSI. In some implementations, the system adds a number of hops for each mesh point (e.g., 0 means root, non-zero means mesh child), which may increase or affect the latency of a network. In other implementations, the system is operable to perform additional configuration changes in response to determining: or learning that a particular application requires low-latency. For example, as indicated at FIG. 3C, a system is operable to configure different settings 300C, including settings associated with whether the system allows a Host Scan (320), a DFS Channel Scan (322), how long a system device or component dwells on a scan channel (324), what criterion is used for roaming (326), and if sleep (power save) is allowed (328).

In some implementations, the system employs machine-learning techniques for determining application needs and user preferences. The learning can be done through packet inspection, assessing data streams that are associated with specific protocols included in the IP protocol suite (e.g., TCP, user datagram protocol (UDP), real-time transport protocol (RTP)), assessing whether there are regular ping packets (e.g., some gaming applications display real-time ping latency), assessing transmission patterns, assessing access categories used, assessing TCP ramp up pattern, assessing a user computing context of the client device.

When multiple applications run in parallel with different needs, the system can learn which application is most important to a specific user (316). This teaming can be done through analysis of foreground versus background applications, real-time user survey through notification, user intervention, or real-time user preference selection through notification. In addition to general application need based on device side WI-FI configuration, some client devices can notify a particular WI-FI (e.g., a g WI-FI) access point about the client device's application needs so that the access point can also adjust configurations on the access point side to better serve the applications on the client device.

If users have specific WI-FI configuration requests on a client device or on the network where users can specify higher priority of a particular device, then the users can enter these configuration details as user preference. This can be useful if users are interested in exploring different configuration options.

Figure 4A:
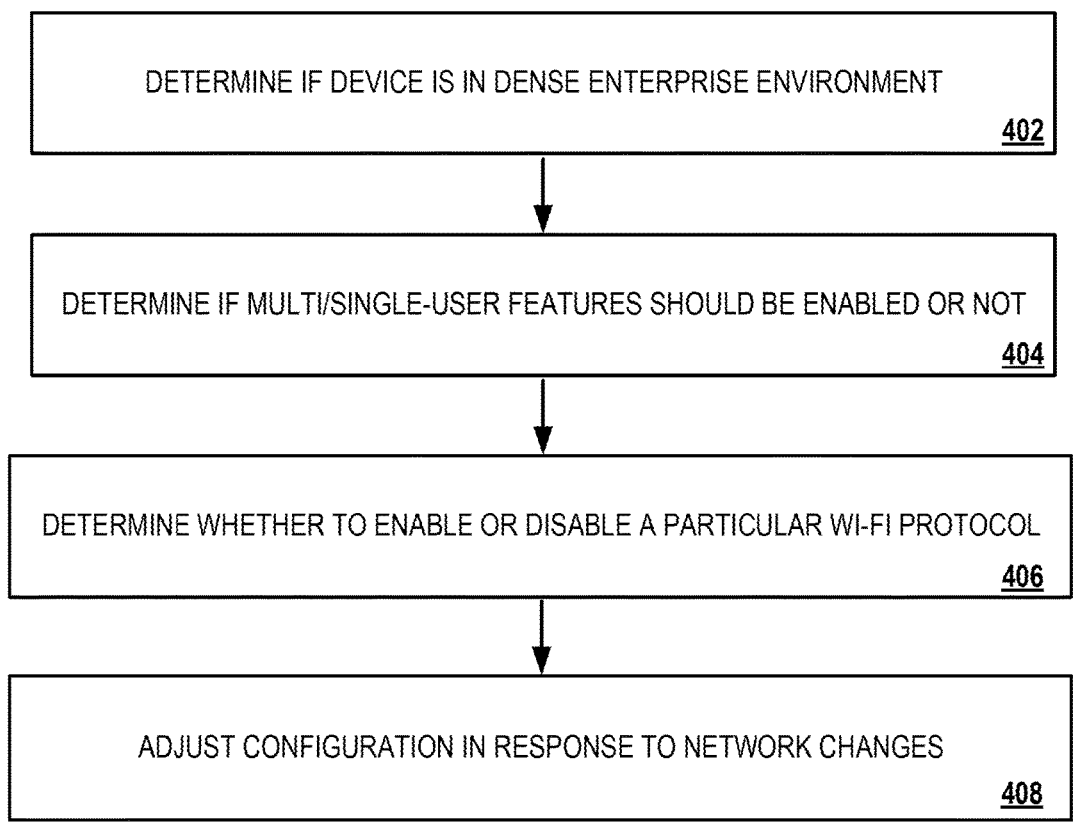
FIGS. 4A and 4B are flow charts of example processes for configuring a mobile device in a wireless network using attributes or conditions of the network.

FIG. 4A is a flow chart of an example process 400A for configuring a client device in a wireless network based on learned attributes of the wireless network.

The 802.11ac protocol describes downlink (DL) multi-user (MU) MIMO and the 802.11ax protocol describes DL/uplink(UL) MU MIMO and DL/UL orthogonal frequency division multiple access (OFDMA) which are both multi-user techniques adopted in recent WI-FI standards. Multi-user features can benefit overall network capacity. Hence, these features can be especially useful in dense enterprise environment, such as a wireless network with multiple users. In some implementations, a client device detects or determines whether it is located in a dense enterprise environment (402). Due to the overhead of multi-user features, such as channel sounding overhead for MU MIMO and a lower per user rate compared to single user due to multi-user interference, a client device may find more benefit in terms of both throughput and power to disable multi-user features in relatively clean environments. The client device can collect CCA busy time in a wireless network to determine if multi-user features should be enabled or not (404). For example, the client device detects that it is in a clean environments and proceeds to disable multi-user features in favor of single-user features. Conversely, a client device can determine that it is in dense enterprise environment and proceed to enable or re-enable multi-user features.

Similarly, the 802.11ax protocol describes that 1024 quadrature amplitude modulation (1024QAM) requires better than −40 dB error-vector magnitude (EVM) and consumes more power than modulation modes described in the 802.11ac protocol. In some implementations, 1024QAM is only practical for a very short range and some users may not ever use the top rates (e.g., transmission rates) described in the 802.11ax protocol. Based on the Rx rate histogram and the Tx rate histogram, the system can determine whether to disable the 802.11ax protocol and use a mode of the 802.11ac protocol even if hardware features of a client device can use modes of the 802.11ax protocol (406). In this manner, using the 802.11ac protocol can save power without compromising device performance.

By learning attributes of a wireless network, a client device can also identify if the network operation condition changes significantly over time. The changes can be related to factors such as how many client devices are concurrently active, how crowded a particular channel is, locations of client devices within a wireless network, etc. If operation conditions of a wireless network change significantly, wireless configuration settings at a client device can be dynamically adjusted in accordance with the network changes (408). In some implementations, rather than change dynamically, configuration settings at a client device can be personalized for a user.

Figure 4B:
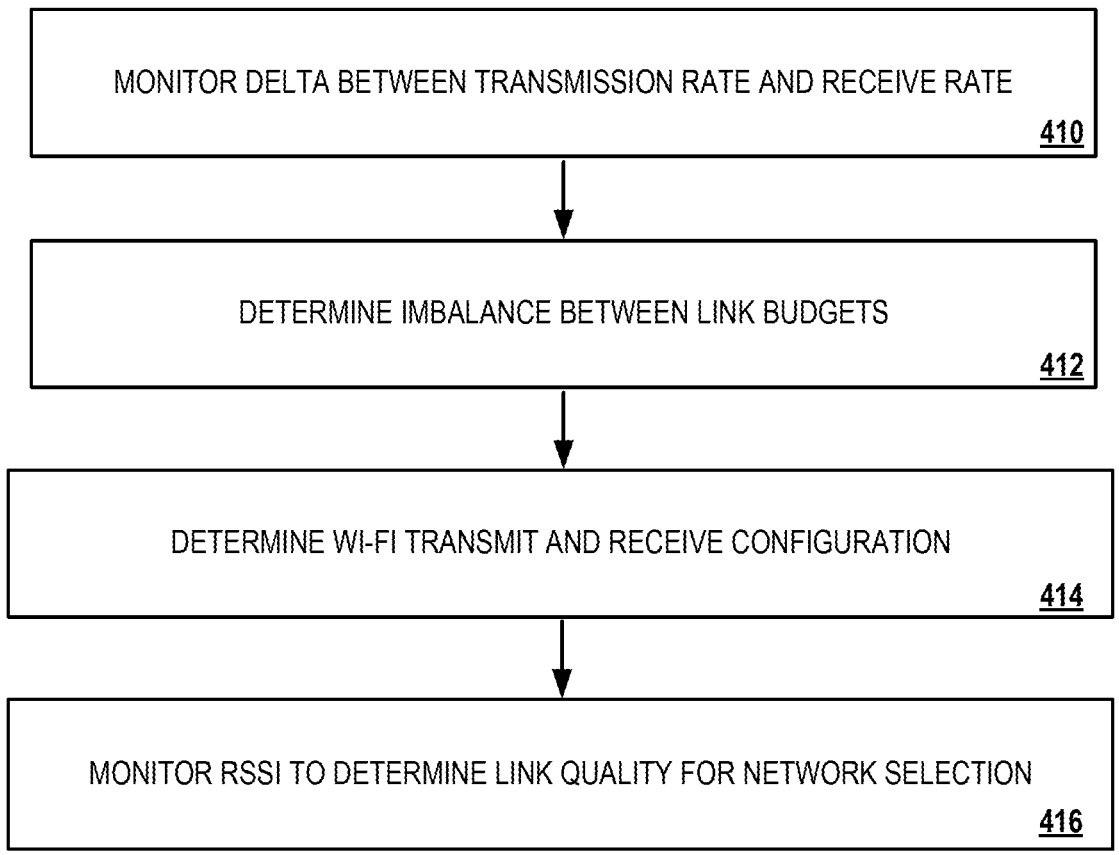

FIG. 4B is a flow chart of an example process 400B for configuring a client device in a wireless network using learned WI-FI operation conditions of the wireless network.

The client device monitors the delta (difference) between transmission rates and receive rates (410). When there is a large delta, the system can infer that there is a large imbalance between the link budget from STA1 to STA2 versus from STA2 to STA1 (412). STA1 and STA2 can be wireless access points, client devices, service access points (SAP), peer-to-peer devices (P2P), etc. A link budget generally refers to transmitter output power less path loss and less receiver noise. The imbalance can result from devices that have different transmit and receive performance (e.g., transmit power and receive noise).

When a client device detects a large imbalance of the links, the system can configure WI-FI in different Tx and Rx configurations, such as 1×2 (as one transmit chain and two receive chains) or 2×1 (as two transmit chains and one receive chain) depending on attributes of a receiver link (414). The system can also provide data communications to other WI-FI control units to inform the units of the configuration. For example, a client device can monitor received signal strength (e.g., RSSI) to determine link quality, which can in turn be used for network selection and other functions (416). In some implementations, the system captures only receive link quality. However, if transmitter link is the weaker link, then the system can monitor and probe transmit link quality rather than receive link quality.

In addition to the techniques described above with reference to FIGS. 2, 3A/B, and 4A/B, other methods and techniques for optimizing configurations at a client device are also described.

In general, one optimization technique involves use of WI-FI connection quality to predict WI-FI un-usability or degraded performance before the un-usability or degraded performance occurs. Hence, a client device can proactively switch to a different network (e.g., another WI-FI network or communication technology), when available, before a user encounters degraded performance or degraded usage experience. Techniques and methods are described below for enabling these optimization features. In some implementations, similar predictions can be applied for usability in order to influence a decision about whether a WI-FI connection will be attempted or if a certain WI-FI wireless network will be selected as a default route.

In some examples, the described optimization techniques can provide improved signal quality that results in more stable data connections between access points and user/client devices in a wireless network. The improved connection stability can lead to reductions in, resource utilization needed to perform association processes between user devices and access points or operations for re-establishing failed or severed data connections.

In some examples, the client device or other component(s) of a wireless communication system, can measure the stability of a wireless (e.g., data) connection between an access point of a wireless network and a client device. The data connection can be a new data connection or an existing/on-going data connection. The measure of stability can be determined based on learned inferences or predicted characteristics of an example data model generated by system 100 and for access by the client device. In some cases, a measure of stability indicates a duration of the data connection. In some cases, a measure of stability indicates an inferred duration of an ongoing data connection and provides a likelihood (e.g., a probability) of the ongoing data connection being susceptible to a connection failure that severs a data connection between a client device that is wirelessly coupled to an access point.

The techniques include adjusting parameters of an association process involving the client device based on a determined configuration setting for the client device. The association process is between the client device and the access point and the parameters of the association process are adjusted to increase the measure of stability of the data connection, such as a new or subsequent data connection or an on-going data connection. For example, the parameters are adjusted to obtain a more stable data connection such that the client device is less susceptible to experiencing a failed or severed data connection with an access point.

In some implementations, the system 100 monitors a number of successful packet transmissions, a number of failed packet transmissions, a number of successful packet receptions, (the number of failed packet receptions is unknown), a ratio of data moved vs stalled/stuck, and retry counters. When an access point beacon RSSI is lower than a threshold value, and there is no interact traffic, the system sends a probing packet to check if transmission is successful and if reception is successful. When transmission fails even at the most reliable transmission rate, or when there is no successful reception, the system predicts WI-FI features will likely disconnect soon.

In some implementations, the system models access point beacon RSSI as a linear model. The linear model can be based on the expression: RSSI @ time (N+M)sec=RSSI@ time Nsec+RSSI_velocity*M. The access point beacon RSSI indicates WI-FI signal strength at a receiver of a client device. The system 100 can use a Kalman filter to update the model every M second (sec) and can use the model to predict RSSI @ time (N+P) sec at time N sec. If the predicted RSSI at (N+P)sec is lower than a RSSI threshold (RSSIleave), the system predicts WI-FI will likely disconnect in P sec. In general, each of N, M, and P is a respective numerical value, such as an integer value, where an example of M=3 sec and P=15 sec can be used. Variations of this method can include modeling an access point beacon RSSI as a second order model based on the expression: RSSI @ time (N+M) sec=RSSI @ time Nsec+RSSI_velocity*M+RSSI_acceleration*(½)M2 Adapt P based on prediction error. In one example, if a predicted RSSI @ time (N+P)sec has a variance larger than a threshold variance, then P can be reduced to adjust the observed variance. Predictions for RSSI can also be implemented with other algorithms, such as moving averages or other predictive modeling algorithms.

In some implementations, the system 100 obtains all relevant WI-FI link layer metrics. The metrics can include access point beacon RSSI, number of successful transmissions, number of failed transmissions, number of successful receptions, number of transmission retries, number of beacons received and missed, radio transmission time, radio reception time, CCA busy time, last successful transmission rate (link speed), and last successful reception rate. The system can, obtain the metrics for the past X sec and predicts whether WI-FI features will became unusable (e.g., experience a data stall) and disconnect in Y sec, X and can each be a respective numerical value, such as an integer value. In some implementations, the predictions can be defined as a machine-learning problem. In this context, the system collects or obtains server or cloud-based data on WI-FI link layer metrics during X sec from Y sec before each WI-FI unusability event and estimates a mapping function to predict WI-FI connection quality given past WI-FI link layer metrics. The X sec and Y sec can be also learned for the best mapping, such as a mapping that achieves a desired or threshold number successful transmissions, successful receptions, beacons received, or uplink/downlink speed. In some implementations the system estimates the mapping function using machine-learning logic.

The data collection can be performed automatically usability event triggers a set of data collection in the past (X+Y)sec, e.g., starting with 30 sec. Data that includes detailed WI-FI performance can be also collected for training an example machine-learning (ML) model in order to avoid false positive predictions. When WI-FI connection issue (e.g., disconnect or data stall) is predicted by one or more of these methods, additional checks can be performed to enhance prediction reliability, and avoid flipping between wireless networks relative to one more client devices. These additional checks can include comparing a current WI-FI access point beacon RSSI with a WI-FI network entering threshold, indicated by an example parameter such as RSSIenter. If current a RSSI is above a threshold indicated by RSSIenter, the client device can be commanded, by the system 100, to not leave its current WI-FI network, since it would likely just rejoin that same network. In some examples, the system is operable to check a number of successful transmissions and a number of successful receptions. If these numbers are within a predefined range for indicating recent successful transmissions and receptions, the client device can be commanded to not leave its current WI-FI network.

In some implementations, RSSI is an example parameter indicated as RSSIcheck. The system 100 is operable to adjust RSSIleave, which can be applicable to techniques described above with reference to methods for modeling access point beacon RSSI. In one example, RSSIleave can be first set to be the same as RSSIenter. The system can reduce RSSIleave for a currently associated WI-FE network data or other parameter values obtained by the system indicates WI-FI connection quality is better than expected. For example, one method to reduce RSSIleave includes reducing RSSIleave by a particular delta in response to determining that RSSIcheck is close to, or within a threshold value of, RSSIleave and transmission success rate is greater than a threshold success rate. The transmission success rate can correspond to a number of successful transmissions relative to a total number of transmissions. Another method for reducing RSSIleave includes setting RSSIleave equal to min(SSIleave, RSSIcheck).

Figure 5:
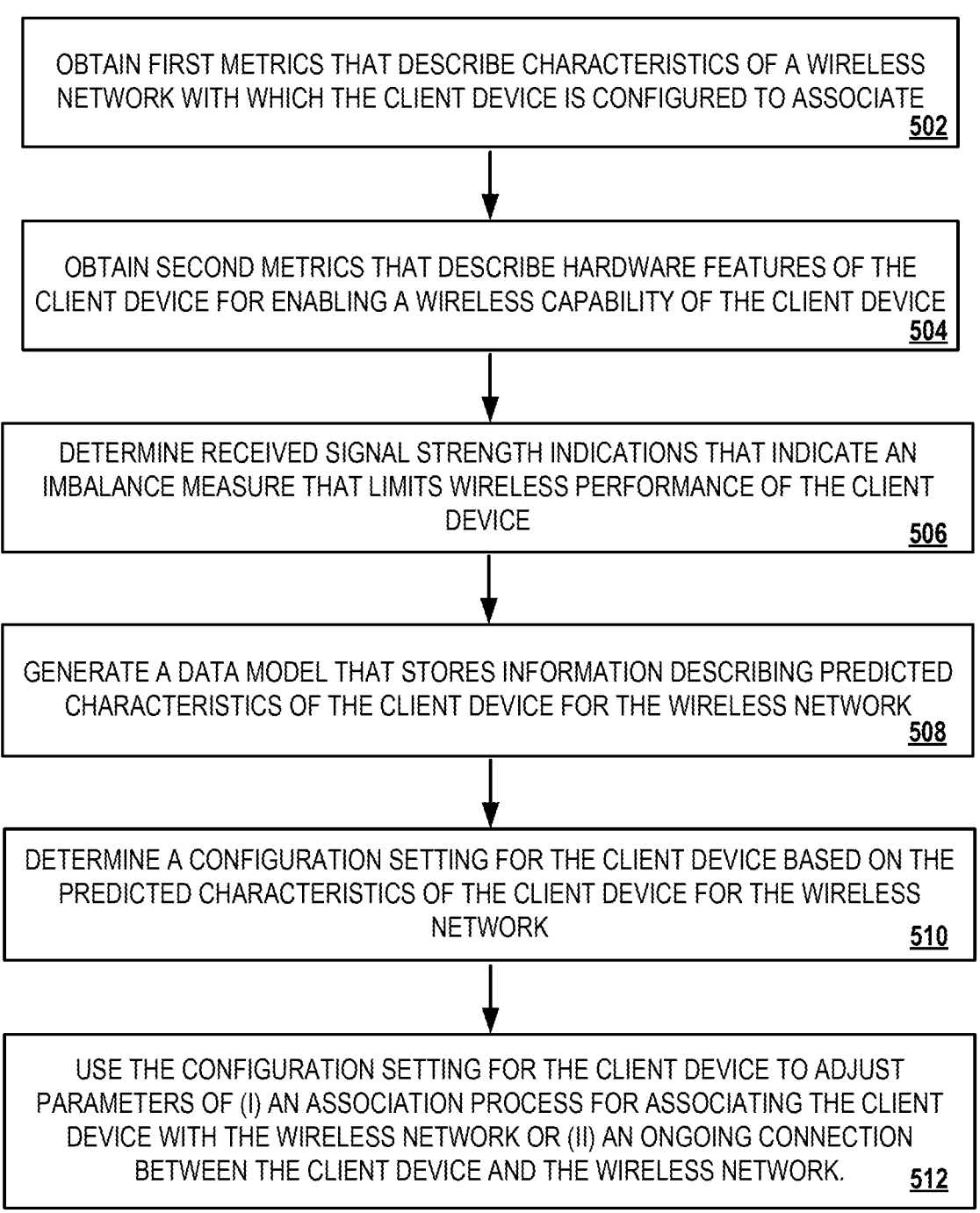
FIG. 5 is a flow chart of an example process for configuring a mobile device in a wireless network based on predicted characteristics of the mobile device.

FIG. 5 is a flow chart of an example process 500 for configuring a mobile device in a wireless network based on predicted characteristics of the mobile device as well as other devices in a wireless network. Process 500 can be performed using one or more computers or computing resources of system 100. Referring now to process 500, a client device obtains first metrics that describe characteristics of a wireless network with which the client device is configured to associate (502). A client device can associate with an access point by connecting to, or interacting with, the access point to establish a data connection with the access point.

For example, the client device can be a smartphone and the access point can be a wireless router for a WIFI network. The client device connects/associates with the wireless router by identifying a signal (e.g., a beacon) transmitted by the wireless router that indicates an SSID (Service Set Identifier) of the wireless router and authenticating with the wireless router, e.g., by providing password or passcode that is accepted by the wireless router. The client device can also obtain second metrics that describe hardware features of the client device (504). The hardware features are used to enable a wireless capability of the client device. The client device determines one or more received signal strength indications that indicate at least one imbalance measure that limits wireless performance of the client device (506).

The client device generates a data model that stores information describing predicted characteristics of the client device for the wireless network (508). For example, the data model can be generated based on analysis of the first metrics, the second metrics, and the one or more received signal strength indications determined by the client device. In general, the metrics can be associated with various settings (e.g., wireless settings) at a client device, wireless network, or both. The data model can be generated at system 100 using an example machine-learning engine that processes the first and second metrics with reference to the RSSI values to predict or infer relationships between the metrics and RSSI observed at the system 100. For example, the relationships can be used to predict or infer how received signal strength values are affected by different metrics or configuration settings of the client device and wireless network.

In some implementations, generating the data model includes computing first inferences based on the first metrics. The first and second metrics can include one or more parameter values that indicate throughput experienced at the client device, power consumption at the client device, latency associated with various processes in the wireless network, range for transmitting information in the wireless network, or a reliability of data connections in the network. The first inferences can correspond to an inferred rate selection algorithm of an access point of the wireless network or an inferred receive rate of the access point of the wireless network. The second inferences can correspond to a modulation and coding scheme of the client device or a transmission rate of the client device.

System 100 determines a configuration setting for the client device based on the predicted characteristics of the client device for the wireless network (510). For example, determining the configuration setting for the client device can include computing RSSI values (e.g., new RSSI values) based on the predicted characteristics of the data model. The RSSI values indicate relative received signal strength in the wireless network. Determining the configuration setting for the client device can also include determining a measure of received signal strength imbalance between two respective channels of the client device based on the relative received signal strength in, the wireless network. In some implementations, the configuration setting for the client device is determined based on the measure of received signal strength imbalance between the two respective channels of the client device. The system 100 can determine the configuration setting locally at the client device. In some cases, the system 100 uses a non-local, remote, or cloud-based computing resource to determine configuration setting for the client device.

The system 100 can use the configuration setting for the client device to adjust parameters of at the client device (512). For example, the configuration setting can be used to adjust parameters of (i) an association process for associating the client device with the wireless no work or (ii) an ongoing connection between the client device and the wireless network.

Figure 6:
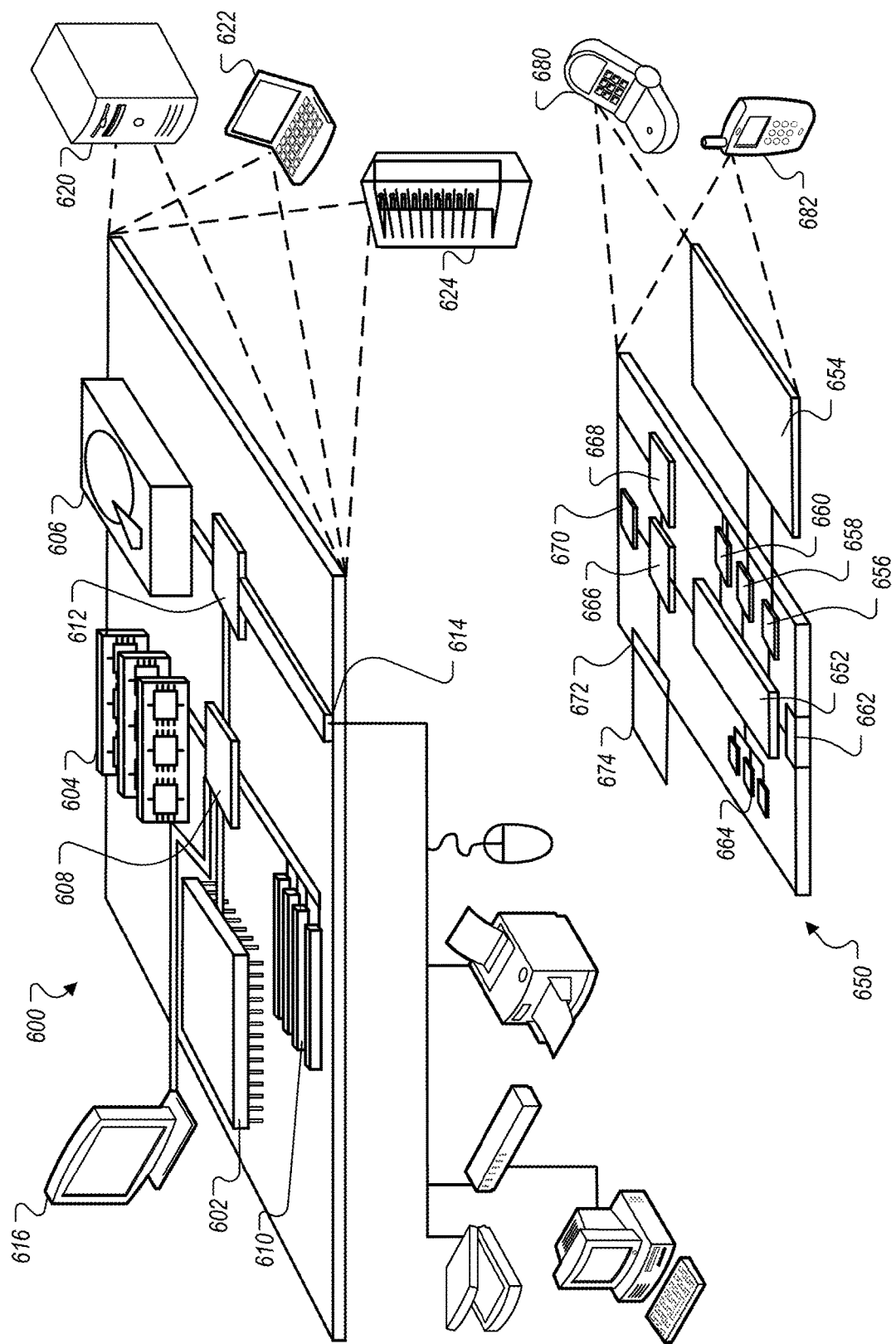
FIG. 6 is a block diagram of a computing system that can be used in connection with computer-implemented methods described in this document.

FIG. 6 is a block diagram of computing devices 600, 650 that may be used to implement the systems and methods described in this document, either as a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in, other manners as appropriate. The processor 602 can process instructions for execution within the computing device 600, including instructions stored in the memory 604 or on the storage device 606 to display graphical information fora GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low speed expansion port, which, may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted an a common motherboard or in other manners as appropriate.

The processor 652 can process instructions for execution within the computing device 650, including instructions stored m the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 65$ may receive commands from a user and convert them for submission to the processor 652. In addition, an external interface 662 may be provided in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, OPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one, or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to, a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by, virtue of computer programs running on the respective computers and having a client-server relationship to each other.

A number of embodiments have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

Particular embodiments, of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

obtaining, at a client device, first metrics that describe characteristics of a wireless network with which the client device is configured to associate;

obtaining, at the client device, second metrics that describe hardware features of the client device, the hardware features being used to enable a wireless capability of the client device;

determining, at the client device, one or more received signal strength indications that indicate at least one imbalance measure that limits wireless performance of the client device, wherein determining the one or more received signal strength indications comprises determining at least one received signal strength indication for a communication channel of the client device in response to detecting a change in a transmission rate or a modulation scheme of an access point included in the wireless network;

generating, at the client device, a data model that stores information describing predicted characteristics of the client device for the wireless network, the data model being generated based on analysis of the first metrics, the second metrics, and the one or more received signal strength indications;

determining a configuration setting for the client device based on the predicted characteristics of the client device for the wireless network;

using the configuration setting for the client device to adjust a parameter of at least one of (i) an association process for associating the client device with the wireless network or (ii) an ongoing connection between the client device and the wireless network;

determining, based on the predicted characteristics of the data model, a first measure of stability of a data connection between the access point of the wireless network and the client device, the first measure of stability indicating a duration of the data connection; and adjusting, based on the configuration setting for the client device, a parameter of a first association process between the client device and the access point to increase the first measure of stability of the data connection.

2. The method of claim 1, wherein generating the data model comprises:
computing first inferences based on the first metrics, wherein the first inferences correspond to at least one of: an inferred rate selection algorithm of the access point of the wireless network or an inferred receive rate of the access point of the wireless network.

3. The method of claim 2, wherein generating the data model comprises:
computing second inferences based on the second metrics, wherein the second inferences correspond to at least one of: a modulation and coding scheme of the client device or a transmission rate of the client device.

4. The method of claim 1, wherein determining the configuration setting for the client device comprises:
computing, based on the predicted characteristics of the data model, a plurality of received signal strength indications that indicate a relative received signal strength in the wireless network;
determining a measure of received signal strength imbalance between two respective channels of the client device based on the relative received signal strength in the wireless network; and
determining the configuration setting for the client device based on the measure of received signal strength imbalance between the two respective channels of the client device.

5. The method of claim 1, wherein determining the configuration setting for the client device comprises:
determining, based on the predicted characteristics of the data model, a resource requirement of the wireless network for using an application accessed at the client device;
generating, based on the resource requirement of the wireless network, a usage profile that indicates usage patterns of the client device in response to using the application; and
determining the configuration setting for the client device based on the usage profile of the client device.

6. The method of claim 5, wherein determining the resource requirement comprises:
determining at least one of: a latency requirement, a data throughput requirement, or a power requirement associated with using the application at the client device.

7. The method of claim 5, wherein generating the usage profile comprises:
obtaining an aggregate set of parameters that describe usage of resources associated with one or more access points of the wireless network when the application is accessed and used at the client device.

8. The method of claim 1, further comprising:
determining, based on the predicted characteristics of the data model, a second measure of stability of an ongoing data connection between the access point of the wireless network and the client device, the second measure of stability indicating an inferred duration of the ongoing data connection; and
adjusting, based on the configuration setting for the client device, a parameter of a second association process between the client device and the access point to increase the second measure of stability of the data connection.

9. A system comprising:
one or more processing devices; and
one or more non-transitory machine-readable storage devices storing instructions that are executable by the one or more processing devices to cause performance of operations comprising:
obtaining, at a client device, first metrics that describe characteristics of a wireless network with which the client device is configured to associate;
obtaining, at the client device, second metrics that describe hardware features of the client device, the hardware features being used to enable a wireless capability of the client device;
determining, at the client device, one or more received signal strength indications that indicate at least one imbalance measure that limits wireless performance of the client device, wherein determining the one or more received signal strength indications comprises determining at least one received signal strength indication for a communication channel of the client device in response to detecting a change in a transmission rate or a modulation scheme of an access point included in the wireless network;
generating, at the client device, a data model that stores information describing predicted characteristics of the client device for the wireless network, the data model being generated based on analysis of the first metrics, the second metrics, and the one or more received signal strength indications;
determining a configuration setting for the client device based on the predicted characteristics of the client device for the wireless network;
using the configuration setting for the client device to adjust a parameter of at least one of (i) an association process for associating the client device with the wireless network or (ii) an ongoing connection between the client device and the wireless network;
determining, based on the predicted characteristics of the data model, a first measure of stability of a data connection between the access point of the wireless network and the client device, the first measure of stability indicating a duration of the data connection; and
adjusting, based on the configuration setting for the client device, a parameter of a first association process between the client device and the access point to increase the first measure of stability of the data connection.

10. The system of claim 9, wherein generating the data model comprises:
computing first inferences based on the first metrics, wherein the first inferences correspond to at least one of: an inferred rate selection algorithm of an access point of the wireless network or an inferred receive rate of the access point of the wireless network.

11. The system of claim 10, wherein generating the data model comprises:
computing second inferences based on the second metrics, wherein the second inferences correspond to at least one of: a modulation and coding scheme of the client device or a transmission rate of the client device.

12. The system of claim 9, wherein determining the configuration setting for the client device comprises:
computing, based on the predicted characteristics of the data model, a plurality of received signal strength indications that indicate a relative received signal strength in the wireless network;

determining a measure of received signal strength imbalance between two respective channels of the client device based on the relative received signal strength in the wireless network; and determining the configuration setting for the client device based on the measure of received signal strength imbalance between the two respective channels of the client device.

13. The system of claim 9, wherein determining the configuration setting for the client device comprises:

determining, based on the predicted characteristics of the data model, a resource requirement of the wireless network for using an application accessed at the client device;

generating, based on the resource requirement of the wireless network, a usage profile that indicates usage patterns of the client device in response to using the application; and determining the configuration setting for the client device based on the usage profile of the client device.

14. The system of claim 13, wherein determining the resource requirement comprises:

determining at least one of: a latency requirement, a data throughput requirement, or a power requirement associated with using the application at the client device.

15. The system of claim 13, wherein generating the usage profile comprises:

obtaining an aggregate set of parameters that describe usage of resources associated with one or more access points of the wireless network when the application is accessed and used at the client device.

16. The system of claim 9, wherein the operations further comprise:

determining, based on the predicted characteristics of the data model, a second measure of stability of an ongoing data connection between the access point of the wireless network and the client device, the second measure of stability indicating an inferred duration of the ongoing data connection; and adjusting, based on the configuration setting for the client device, a parameter of a second association process between the client device and the access point to increase the second measure of stability of the data connection.

17. One or more non-transitory machine-readable storage devices storing instructions that are executable by one or more processing devices to cause performance of operations comprising:

obtaining, at a client device, first metrics that describe characteristics of a wireless network with which the client device is configured to associate;

obtaining, at the client device, second metrics that describe hardware features of the client device, the hardware features being used to enable a wireless capability of the client device;

determining, at the client device, one or more received signal strength indications that indicate at least one imbalance measure that limits wireless performance of the client device, wherein determining the one or more received signal strength indications comprises determining at least one received signal strength indication for a communication channel of the client device in response to detecting a change in a transmission rate or a modulation scheme of an access point included in the wireless network;

generating, at the client device, a data model that stores information describing predicted characteristics of the client device for the wireless network, the data model being generated based on analysis of the first metrics, the second metrics, and the one or more received signal strength indications;

determining a configuration setting for the client device based on the predicted characteristics of the client device for the wireless network;

using the configuration setting for the client device to adjust a parameter of at least one of (i) an association process for associating the client device with the wireless network or (ii) an ongoing connection between the client device and the wireless network;

determining, based on the predicted characteristics of the data model, a first measure of stability of a data connection between the access point of the wireless network and the client device, the first measure of stability indicating a duration of the data connection; and adjusting, based on the configuration setting for the client device, a parameter of a first association process between the client device and the access point to increase the first measure of stability of the data connection.

* * * * *